United States Patent

[11] 3,624,066

[72] Inventors Louis F. Fieser
Belmont;
Sydney Archer, Bethlehem, Mass.; Roman R. Lorenz, East Greenbush, N.Y.
[21] Appl. No. 870,808
[22] Filed Oct. 17, 1969
[45] Patented Nov. 30, 1971
[73] Assignee Sterling Drug Inc.
New York, N.Y.
Original application Oct. 25, 1966, Ser. No. 589,204. Divided and this application Oct. 17, 1969, Ser. No. 870,808

[54] 2-(8-CYCLOHEXYLOCTYL OR 7-CYCLOHEXYLHEPTYL)-4-(4-SULFOPHENYLAZO)-1-NAPHTHOL
2 Claims, No Drawings
[52] U.S. Cl. .................................................. 260/197,
260/247.2 R, 260/294 R, 260/326.3, 260/348 R, 260/396, 260/413, 260/590, 260/578, 424/413
[51] Int. Cl. ...................................................... C07c 107/06

[50] Field of Search........................................... 260/197

[56] References Cited
OTHER REFERENCES
Noller, Chemistry of Organic Compounds, W. B. Saunders Company: Philadelphia. 1965 pages 637– 638.

Primary Examiner—Charles B. Parker
Assistant Examiner—Charles F. Warren
Attorneys—Elmer J. Lawson, B. Woodrow Wyatt, Thomas L. Johnson, Robert K. Bair, R. Clifford Bourgeois, William G. Webb and Roger T. Wolfe ABSTRACT: A process of reacting 2-Q-1-naphthol with a diazotized salt of sulfanilic acid to form a 2-Q-4(4-sulfophenylazo)-1-naphthol; reducing the azo compound to form 4-amino-2-Q-1-naphthol; oxidizing said 4-amino compound to form 2-Q-1,4-dihydro-4-imino-1-oxonaphthalene; and hydrolyzing said 4-imino compound under acidic conditions to form 2-Q-1,4-naphthoquinone where Q is (8-cyclohexyloctyl or 7-cyclohexylheptyl).

2-(8-CYCLOHEXYLOCTYL OR 7-CYCLOHEXYLHEPTYL)-4-(4-SULFOPHENYLAZO)-1-NAPHTHOL

This application is a division of our prior copending application Ser. No. 589,204, filed Oct. 25, 1966.

This invention relates to a process for preparing 1,4-naphthoquinones and to compositions used therein.

In particular, this invention relates to a process for preparing intermediates to 2-hydroxy-3-(8-cyclohexyloctyl)-1,4-naphthoquinone and 2-hydroxy-3-(7-cyclohexylheptyl)-1,4-naphthoquinone, which are potent antimalarial agents.

The process aspect of the invention sought to be patented resides in the process which comprises the steps of: reacting 2-(8-cyclohexyloctyl or 7-cyclohexylheptyl)-1-naphthol with a diazotized salt of sulfanilic acid to form a 2-(8-cyclohexyloctyl or 7-cyclohexylheptyl)-4-(4-sulfophenylazo) -1-naphthol; reducing the azo compound to form 4-amino-2-(8-cyclohexyloctyl or 7-cyclohexylheptyl)-1-naphthol; oxidizing said 4-amino compound to form 2-(8-cyclohexyloctyl or 7-cyclohexylheptyl)-1,4-dihydro-4-imino-1-oxonaphthalene; and hydrolyzing said 4-imino compound under acidic conditions to form 2-(8-cyclohexyloctyl or 7-cyclohexylheptyl)-1,4-naphthoquinone.

The invention sought to be patented, in its composition aspect, resides in the following compounds: 2-(8-cyclohexyloctyl or 7-cyclohexylheptyl)-4-(4-sulfophenylazo)-naphthol, 4-amino-2-(8-cyclohexyloctyl or 7-cyclohexylheptyl)-1-naphthol and 2-(8-cyclohexyloctyl or 7-cyclohexylheptyl)-1,4-dihydro-4-imino-1-oxonaphthalene.

The term "lower-alkyl", as used throughout this specification, means an alkyl radical having from one to six carbon atoms inclusive, illustrated by methyl, ethyl, isopropyl, n-propyl, n-butyl, sec-butyl, isobutyl, n-amyl, n-hexyl, and the like.

A process for the preparation of the starting materials, 2-(8-cyclohexyloctyl)-1-naphthol and 2-(7-cyclohexylheptyl)-1-naphthol, an alternate process of converting them to 2-(8-cyclohexyloctyl)-1,4-naphthoquinone and 2-(7-cyclohexylheptyl)-1,4-naphthoquinone respectively, a process of converting the latter to the above-mentioned 2-hydroxy- 3-(8-cyclohexyloctyl)-1,4-naphthoquinone and 2-hydroxy-3-(7-cyclohexylheptyl)-1,4-naphthoquinone, a process of directly converting 2-(8-cyclohexyloctyl or 7-cyclohexylheptyl)-1-naphthol to 2-hydroxy-3-(8-cyclohexyloctyl or 7-cyclohexylheptyl)-1,4-naphthoquinone, and intermediates used in said processes are disclosed hereinbelow and, also, are disclosed and claimed in copending applications filed on even date herewith and identified below.

Said other processes and intermediates used therein are presented as follows: reacting cyclohexylacetyl halide with 1-BN-cyclohexene or 1-BN-cyclopentene to form 2-cyclohexylacetyl-1-BN-cyclohexene or 2-cyclohexylacetyl-1-BN-cyclopentene respectively or reacting 3-cyclohexylpropanoyl halide with 1-BN-cyclopentene to form 2-(3-cyclohexylpropanoyl)-1-BN-cyclopentene where BN is morpholino, piperidino, pyrrolidino or di(lower-alkyl)amino; heating the 2-acyl-1-BN-cycloalkene in an acidic aqueous medium to form 2-cyclohexylacetylcyclohexanone, 2-cyclohexylacetylcyclopentanone or 2-(3-cyclohexylpropanoyl)cyclopentanone respectively; heating the 2-acyl-cycloalkanone in an aqueous alkaline medium to form 8-cyclohexyl-7-ketooctanoic acid, 7-cyclohexyl-6-ketoheptanoic acid or 8-cyclohexyl-6-ketooctanoic acid respectively; reducing the ketoalkanoic acid to yield 8-cyclohexyloctanoic acid, 7-cyclohexylheptanoic acid or 8-cyclohexyloctanoic acid respectively; reacting 8-cyclohexyloctanoic acid or 7-cyclohexylheptanoic acid with 1-naphthol to form 2-(8-cyclohexyloctanoyl)-1-naphthol or 2-(7-cyclohexylheptanoyl)-1-naphthol respectively; reducing the 2-acyl-1-naphthol to form 2-(8-cyclohexyloctyl)-1-napthol or 2-(7-cyclohexylheptyl)-1-naphthol respectively; oxidizing 2-(8-cyclohexyloctyl)-1-naphthol or 2-(7-cyclohexylheptyl)-1-naphthol to form 2-(8-cyclohexyloctyl)-1,4-naphthoquinone or 2-(7-cyclohexylheptyl)-1,4-naphthoquinone respectively; reacting the 2-(cycloalkylalkyl)-1,4-naphthoquinone with a peroxide under alkaline conditions to form 2-(8-cyclohexyloctyl)-1,4-naphthoquinone-2,3-oxide or 2-(7-cyclohexylheptyl)-1,4-naphthoquinone-2,3-oxide respectively; and, hydrolyzing the 2,3-oxide under acidic conditions to yield 2-hydroxy-3-(8-cyclohexyloctyl)-1,4-naphthoquinone or 2-hydroxy-3-(7-cyclohexylheptyl)-1,4-naphthoquinone respectively.

The first four of the above-mentioned steps, i.e., through the preparation of 8-cyclohexyloctanoic acid and 7-cyclohexylheptanoic acid, and the products produced by each of the first three steps are disclosed and claimed in copending application Ser. No. 589,201, filed Oct. 25, 1966.

The last five of the above-mentioned steps and the products produced by all but the last of these steps are disclosed and claimed in copending application Ser. No. 589,202, filed Oct. 25, 1966.

3-(8-Cyclohexyloctyl or 7-cyclohexylheptyl)-2-hydroxy-1,4-naphthoquinone also is prepared directly by passing oxygen into a solution of 2-(8-cyclohexyloctyl or 7-cyclohexylheptyl)-1-naphthol as its alkali metal salt in tertiary-butanol containing an alkali metal tertiary-butoxide. This process is disclosed and claimed in copending application Ser. No. 589,203, filed Oct. 25, 1966, now U.S. Pat. No. 3,471,525 issued Oct. 7, 1969.

The manner and process of making and using the instant invention will now be generally described so as to enable a person skilled in the art of chemistry to make and use the same, as follows:

Preparation of Intermediates—The reaction of cyclohexylacetyl halide with 1-BN-cyclohexene or 1-BN-cyclopentene or the reaction of 2-cyclohexylpropanoyl halide with 1-BN-cyclopentene to form 2-cyclohexylacetyl-1-BN-cyclohexene, 2-cyclohexylacetyl-1-BN-cyclopentene or 2-(3-cyclohexylpropanoyl)-1-BN-cyclopentene respectively is carried out by mixing said reactants, using the acyl chlorides preferably, in a suitable inert solvent, e.g., chloroform, dioxane, benzene, etc. and in the presence of an acid-acceptor, e.g., triethylamine, pyridine, dimethylaniline, potassium carbonate, sodium carbonate, etc., while maintaining the temperature of the reaction mixture between about 0 to 50° C., preferably between about 25° to 40° C. The reaction mixture containing 2-cyclohexylacetyl-1-BN-cyclohexene, 2-cyclohexylacetyl-1-BN-cyclopentene or 2-(3-cyclohexylpropanoyl)-1-BN-cyclopentene is then heated, preferably refluxing while stirring, with an aqueous solution containing a mineral acid, e.g., hydrochloric acid, hydrobromic acid, sulfuric acid, etc. to convert the 2-cyclohexyl-acyl-1-BN-cycloalkene to 2-cyclohexylacetylcyclohexanone, 2-cyclohexylacetylcyclopentanone or 2-(3-cyclohexylpropanoyl)cyclopentanone respectively. Preferred embodiments in the above steps are those where BN is morpholino. The conversion of the 2-acylcycloalkanone to the corresponding cyclohexylketoalkanoic acid is affected by heating the 2-cyclohexyl-acylcycloalkanone in an aqueous alkaline medium, e.g., aqueous potassium or sodium hydroxide solution. The resulting cyclohexyl-ketoalkanoic acid is readily reduced by heating it in a suitable solvent, e.g., a water-soluble solvent boiling between about 180°–250° C., preferably between about 180°–220° C., e.g., diethylene glycol, with hydrazine hydrate and subsequent hydrolysis of the resulting hydrazone by heating in the same solvent to form 8-cyclohexyloctanoic acid or 7-cyclohexylheptanoic acid as indicated above; the formation of the hydrazone was carried out by heating the reactants at about 100°–140° C., preferably about 115°–125° C., and the hydrolysis of the hydrazone was accomplished by heating it at about 160°–250° C., preferably about 180°–225° C. Alternatively, but less preferred, the reduction can be run using zinc amalgam and concentrated hydrochloric acid. The reaction of 8-cyclohexyloctanoic acid or 7-cyclohexyl heptanoic acid with 1-naphthol to form 2-(8-cyclohexyloctanoyl or 7-cyclohexylheptanoyl)-1-naphthol is run by heating the reactants in the presence of a condensing agent, e.g., $BF_3$ or $ZnCl_2$, preferably in boron trifluoride etherate at about 95° C. Heating temperatures in the range of about 80° to 120° C. can be used. The reduction of 2-(8-cyclohexyloctanoyl or 7-cyclobexylheptanoyl)-1-naphthol is carried out by heating it with amalgamated zinc and concentrated hydrochloric acid, preferably refluxing in a suitable solvent, e.g., methanol, ethanol, acetic acid, etc., to yield 2-(8-cyclohexyloctyl)-1-naphthol or 2-(7-cyclohexylheptyl)-1-naphthol.

Process of Invention—The four-step process of converting 2-(8-cyclohexyloctyl or 7-cyclohexylheptyl)-1-naphthol to 2-(8-cyclohexyloctyl or 7-cyclohexylheptyl)- 1,4-naphthoquinone is carried out by first reacting 2-(8-cyclohexyloctyl or 7-cyclohexylheptyl)-1-naphthol with a diazotized salt of sulfanilic acid to form 2-(8-cyclohexyloctyl or 7-cyclohexylheptyl)-4-(4-sulfophenylazo)-1-naphthol. The azo compound is reduced to the corresponding 4-amino compound, preferably using sodium hydrosulfite ($Na_2S_2O_4$) in aqueous methanol solution; the reduction also can be run using zinc and hydrochloric acid. The 4-amino compound in a suitable solvent, e.g., acetic acid, is oxidized to 2-(8-cyclohexyloctyl or 7-cyclohexylheptyl)-1,4-dihydro-4-imino-1-oxonaphthalene using chromium trioxide in aqueous acetic acid, preferably in the presence of sulfuric acid and then hydrolyzing the 4-imino sulfate salt in situ by heating the acidic reaction mixture at about 60° to 90° C. to yield 2-(8-cyclohexyloctyl or 7-cyclohexylheptyl)-1,4-naphthoquinone. Alternatively by using no sulfuric acid during the oxidation, the 4-imino compound can be isolated as its chromate salt which is then hydrolyzed under acidic conditions, preferably by treating a hot aqueous acetic acid solution of the imino salt with a mineral acid, e.g., hydrochloric acid or sulfuric acid.

Use of Products of Above Process—The reaction of 2-(8-cyclohexyloctyl or 7-cyclohexylheptyl)-1,4-naphthoquinone to form its 2,3-oxide is carried out by reacting the former compound with a peroxide, e.g., hydrogen peroxide, under alkaline conditions, e.g., aqueous potassium or sodium hydroxide, preferably using a suitable organic solvent, e.g., tertiary-butanol, dioxane. The slightly exothermic reaction is run without any external heating. The 2,3-oxide is hydrolyzed under acidic conditions to produce 3-(8-cyclohexyloctyl or 7-cyclohexylheptyl)-2-hydroxy-1,4-naphthoquinone, the hydrolysis preferably being carried out by dissolving the oxide in concentrated sulfuric acid, adding this solution to a mixture of water (or ice) and acetic acid, and then heating the reaction mixture on a steam bath.

The best mode contemplated for carrying out the invention will now be set forth, as follows:

Cyclohexaneacetyl chloride'A solution of 430 g. cyclohexaneacetic acid in 1,000 ml. of chloroform was added to 430 g. (3.6 moles) of thionyl chloride at such a rate as to maintain gentle reflux. After the addition was completed the reaction was refluxed for two hours. The chloroform was removed in vacuo and the residue was distilled. A total of 432 g. (90 percent) of colorless oil, b.p. 88°–92° C./18 mm., was collected.

1-Morpholinocyclohexene—A solution of 180 g. (2.04 moles) of morpholine, 196 g. (2.00 moles) of cyclohexanone, 400 ml. of benzene and 1.0 g. of p-toluenesulfonic acid was refluxed for twenty hours, during which time a total of 39 ml. of water was collected. The benzene was removed under vacuum and the residue was distilled. A total of 265 g. (79 percent) of product, b.p. 114°–116° C./12 mm., was collected.

Following the above-described procedure for the preparation of 1-morpholinocyclohexene but using piperidine, pyrrolidine, dimethylamine, diethylamine, di-n-propylamine or di-n-hexylamine in place of morpholine, there is obtained, respectively, 1-piperidinocyclohexene, 1-pyrrolidinocyclohexene, 1-dimethylaminocyclohexene, 1-diethylaminocyclohexene, 1-di-n-propylaminocyclohexene or 1-di-n-hexylaminocyclohexene. Following the above procedure for the preparation of 1-morpholinocyclohexene and using cyclopentanone in place of cyclohexanone and using morpholine, piperidine or diethylamine, there is obtained, respectively, 1-morpholinocyclopentene, 1-piperidinocyclopentene or 1-diethylaminocyclopentene.

2-Cyclohexylacetylcyclohexanone—A solution of 288 g. (1.72 moles) of freshly prepared 1-morpholinocyclohexene and 188 g. (1.87 moles) of triethylamine (dried over KOH) in 1,000 ml. of chloroform was treated over a period of one hundred thirty minutes with a solution of 273 g. (1.70 moles) of cyclohexaneacetyl chloride in 500 ml. of chloroform while maintaining the temperature at 28°–35° C. by means of a water bath. During the addition, the system was protected with a calcium chloride drying tube. Immediately following the addition, the reaction mixture was stored at 4° C. for sixteen hours. The light yellow solution containing 2-cyclohexylacetyl-1-morpholinocyclohexene was treated with a solution of 225 ml. (2.7 moles) of concentrated hydrochloric acid in 550 ml. of water and the two-phase system was refluxed for two hours while stirring rapidly. The mixture was cooled and separated. The chloroform solution was washed with water, 5 percent sodium bicarbonate solution and twice more with water (to obtain a pH of 7.0). The chloroform was removed under vacuum. The fraction boiling at 128°–131° C./0.05 mm. was collected to yield 275 g. (72 percent) of 2-cyclohexylacetylcyclohexanone as a light yellow oil.

Following the above procedure for the preparation of 2-cyclohexylacetylcyclohexanone but using 1-piperidinocyclohexene, 1-pyrrolidinocyclohexene, 1-dimethylaminocyclohexene, 1-diethylaminocyclohexene, 1-di-n-propylaminocyclohexene, 1-di-n-hexylaminocyclohexene, 1-morpholinocyclopentene, 1-piperidinocyclopentene of 1-diethylaminocyclopentene, in place of 1-morpholinocyclohexene, there is first obtained, respectively, 2-cyclohexylacetyl-1-piperidinocyclohexene, 2-cyclohexylacetyl-1-pyrrolidinocyclohexene, 2-cyclohexylacetyl-1-dimethylaminocyclohexene, 2-cyclohexylacetyl-1-diethylaminocyclohexene, 2-cyclohexylacetyl-1-di-n-propylaminocyclohexene, 2-cyclohexylacetyl-1-di-n-hexylaminocyclohexene, 2-cyclohexylacetyl-1-morpholinocyclopentene, 2-cyclohexylacetyl-1-piperidinocyclopentene or 2-cyclohexylacetyl-1-diethylaminocyclopentene, each of which is then converted on acid hydrolysis, as above, to yield 2-cyclohexylacetylcyclohexanone from said cyclohexene derivatives and 2-cyclohexylacetylcyclopentanone from said cyclopentene derivatives. Following the above procedure for the preparation of 2-cyclohexylacetylcyclohexanone but using 1-morpholinocyclopentene, 1-piperidinocyclopentene or 1-diethylaminocyclopentene in place of 1-morpholinocyclohexene and 3-cyclohexylpropanoyl chloride in place of cyclohexylacetyl chloride there is first obtained, respectively 2-(3-cyclohexylpropanoyl)-1-morpholinocyclopentene, 2-(3-cyclohexylpropanoyl)-1-piperidinocyclopentene or 2(3-cyclohexylpropanoyl)-1-diethylaminocyclopentene, each of which on acidic hydrolysis as above yields 2-(3-cyclohexylpropanoyl)cyclopentanone.

8-Cyclohexyl-7-ketooctanoic Acid—A solution of 190 g. (3.4 moles) of potassium hydroxide in 1,000 ml. of water was heated to reflux in a 3-liter 3-neck flask. With vigorous stirring 275 g. (1.23 moles) of 2-cyclohexylacetylcyclohexanone was added over a period of several minutes while maintaining reflux temperature. The light yellow reaction mixture immediately became homogeneous and it was quickly cooled in ice. While cooling and stirring, the reaction mixture was acidified slowly whereby the product precipitated. After cooling to b 10° C., the product was filtered and dried at 35° C. in vacuum for twenty hours. A total of 298 g. (100 percent) of the white crystalline 8-cyclohexyl-7-ketooctanoic acid, m.p. 61°–63 C., was obtained.

Following the above-described procedure for the preparation of 8-cyclohexyl-7-ketooctanoic acid but using 2-(3-cyclohexylpropanoyl)cyclopentanone or 2-cyclohexylacetylcyclopentanone in place of 2-cyclohexylacetylcyclohexanone, there is obtained 8-cyclohexyl-6-ketooctanoic acid or 7-cyclohexyl-6-ketoheptanoic acid respectively.

8-Cyclohexyloctanoic Acid—A solution of 23.7 g. (0.089 mole) of 8-cyclohexyl-7-ketooctanoic acid, 16 ml. of 85 percent hydrazine hydrate and 150 ml. of diethylene glycol was heated at 120° C. for four hours. The solution was cooled to about 60° C.; excess water and hydrazine hydrate was removed under vacuum while raising the temperature back to 120° C. The cloudy, buff colored solution was again cooled to about 60° C. and 25 g. of potassium hydroxide was added. Under a nitrogen atmosphere, the temperature of the mixture was raised to 220° C. over a period of one and one-half hours. The temperature was maintained at 220° C. until the solution just started to darken (approximately thirty minutes); the solution was then carefully poured into about three volumes of ice and water. After the mixture was acidified with concentrated hydrochloric acid, it was extracted three times with ether. The combined ether extracts were dried over $CaCl_2$, charcoaled and concentrated in vacuum. The light brown residue, which readily crystallized, weighed 17.5 g. (87 percent). The crude product was recrystallized from methanol, using a dry ice-acetone bath. The filtration was carried out in the refrigerator since the product readily redissolved at room temperature. The yield was 15.0 g. (75 percent) of 8-cyclohexyloctanoic acid, m.p. 41°–42° C.

8-Cyclohexyloctanoic acid is also obtained following the above-described procedure but using 8-cyclohexyl-6-ketooctanoic acid in place of 8-cyclohexyl-7-ketooctanoic acid; 7-cyclohexylheptanoic acid is obtained using 7-cyclohexyl-6-ketoheptanoic acid in place of 8-cyclohexyl-7-ketooctanoic acid.

2-(8-Cyclohexyloctanoyl)-1-naphthol—A solution of 43.9 g. (0.193 moles) of 8-cyclohexyloctanoic acid and 29.3 g. (0.0203 mole) of a-naphthol in 125 ml. of boron trifluoride etherate (47 percent) was stirred and heated on a steam bath for one hour. A total of 200 ml. of water was added carefully but fairly rapidly while a vigorous evolution of ether ensued. The mixture was cooled and an additional 250 ml. of water was added. The product was extracted with chloroform. The extracts were washed twice with water, dried over $CaCl_2$ and charcoaled, and finally concentrated in vacuum. The brown residue, which weighed 82.0 g., crystallized on cooling. The crude product was slurried in 300 ml. of cold methanol and collected; the bright yellow precipitate was washed with about 50 ml. of cold methanol. After drying sixteen hours at 30° C. in vacuum, the product, 2-(8-cyclohexyloctanoyl)1-naphthol, weighed 51.2 g. (75 percent) and melted at 86°–87° C. 2-(8-Cyclohexyloctanoyl)-1-naphthol when tested by standard in vitro antibacterial procedures was found to have antibacterial activity, thereby indicating its further use as an antibacterial agent.

Following the above-described procedure but using 7-cyclohexylheptanoic acid in place of 8-cyclohexyloctanoic acid, there is obtained 2-(7-cyclohexylheptanoyl)-1-naphthol.

2-(8-Cyclohexyloctyl)-1-naphthol—A mixture of 24.3 g. (0.069 mole) of 2-(8-cyclohexyloctanoyl)-1-naphthol, 100 g. of amalgamated zinc, 500 ml. of methanol and 100 ml. of concentrated hydrochloric acid was refluxed while stirring vigorously for one hour. An additional 100 ml. of concentrated hydrochloric acid was added and refluxing was continued for two hours. The volume was reduced to about 250 ml. in vacuo and then diluted with 200 ml. of water. The product was extracted with ether; the extracts were combined, dried over $CaCl_2$ and concentrated. The residue was crystallized from n-pentane by cooling in a dry ice-acetone bath. The product was dried at room temperature under vacuum to yield 19.5 g. (84 percent) of 2-(8-cyclohexyloctyl)-1-naphthol, m.p. 38°–39° C.

Following the above-described procedure for the preparation of 2-(8-cyclohexyloctyl)-1-naphthol but using 2-(7-cyclohexylheptanoyl)-1-naphthol in place of 2-(8-cyclohexyloctanoyl)-1-naphthol, 2-(b 7-cyclohexylheptyl)-1-naphthol is obtained.

2-(8-Cyclohexyloctyl)-1,4-naphthoquinone (via 4-amino-1-naphthol)—A mixture of 23.4 g. (0.135 mole) of sulfanilic acid and 7.2 g. (0.0675 mole) of sodium carbonate in 135 ml. of water was heated until the materials were in solution. The solution was cooled to about 15° C. and a cold solution of 10.2 g. (0.147 mole) of sodium nitrite in 27 ml. of water was added.

The resulting solution was poured at once into a mixture of 30 ml. of concentrated hydrochloric acid and 160 g. of ice. The reaction was allowed to stand in an ice bath for twenty minutes. In a 2-liter, 3-neck flask 45.9 g. (0.135 mole) of 2-(8-cyclohexyloctyl)-1-naphthol in 270 ml. methanol was treated with a solution of 30 g. of sodium hydroxide in 120 ml. of water and the slurry was cooled to 25° C. The suspension of the diazonium salt was then added, using 45 ml. of methanol to wash it in. The resulting purple solution containing 2-(8-cyclohexyloctyl)-4-(4-sulfophenylazo)-1-naphthol was stirred for twenty minutes. After heating the solution to 40° C. on a steam bath, a slurry of 67.2 g. of sodium hydrosulfite ($Na_2S_2O_4$) in 200 ml. of water was added cautiously and the temperature of the mixture was raised to 80° C. The reaction mixture turned bright yellow within minutes and it was stirred for fifteen minutes without additional heating. The 4-amino-2-(8-cyclohexyloctyl)1-naphthol was collected and washed with water. To oxidize said 4-aminonaphthol, the moist precipitate was suspended in 350 ml. of acetic acid and the suspension was added fairly rapidly to a stirred solution of 30 g. of chromium trioxide ($CrO_3$) in 300 ml. of acetic acid and 60 ml. of water while maintaining the temperature at 60° C. After five minutes the mixture was cooled and the precipitate collected. The brown crystalline 2-(8-cyclohexyloctyl)-1,4-dihydro-4-imino-1-oxonaphthalene chromate salt was placed in a desiccator overnight. The imine salt was hydrolyzed by dissolving it in 250 ml. hot acetic acid and adding 250 ml. concentrated hydrochloric acid to the solution. After cooling, the reaction mixture was poured into 500 ml. of water. The crystalline product that separated was collected and recrystallized from absolute ethanol to yield 32.0 g. (67 percent) of light brown crystalline 2-(8-cyclohexyloctyl)- 1,4-naphthoquinone, m.p. 82°–83° C.

In another run of the above-described procedure, a 3(8modification was the oxidation of the 4-aminonaphthol as its sulfate salt, said modification being illustrated as follows: To a solution (cooled to 20° C.) containing 1.4 liters of water, 700 ml. of concentrated sulfuric acid, 4.1 liters of acetic acid and 415 g. of chromium trioxide was added, with external cooling, a slurry of 4-amino-2-(8-cyclohexyloctyl)-1-naphthol [obtained as above through the azo compound from 637 g. of 2-(8-cyclohexyloctyl)-1-naphthol] in four liters of acetic acid whereupon the temperature of the reaction mixture rose to 45° C. The reaction mixture was then heated on a steam bath; after the temperature had reached 87° C., six liters of water were added to the reaction mixture which was cooled to 8° C. The resulting crystalline precipitate was collected, washed with a total of six liters of water, and dried at room temperature in vacuo over the weekend (sixty-eight hours) to 600 g. (91 percent) of 2-(8-cyclohexyloctyl)-1,4-naphthoquinone, m.p. 79°–81° C.

Following the above-described procedure but starting with 2-(7-cyclohexylheptyl)-1-naphthol instead of 2-(8-cyclohexyloctyl)-1-naphthol, there are obtained respectively 2-(7-cyclohexylheptyl)-4-(4-sulfophenylazo)-1-naphthol, 4-amino-2-(7-cyclohexylheptyl)-1-naphthol, 2-(7-cyclohexylheptyl)-1,4-dihydro-4-imino-1-oxonaphthalene (as chromate or sulfate salt), and 2-(7-cyclohexylheptyl)-1,4-naphthoquinone.

2-(8-Cyclohexyloctyl)-1,4-naphthoquinone-2,3-oxide—To a suspension of 7.7 g. (0.0228 mole) of 2-(8-cyclohexyloctyl)-1,4-naphthoquinone, 1.3 g. (0.0232 mole) of potassium hydroxide in 20 ml. of water, and 100 ml. of tertiary-butanol was added 7.7 ml. of 30 percent hydrogen peroxide and the mixture was stirred at room temperature for one hour (the reaction was slightly exothermic). The mixture was poured into two volumes of water, cooled and filtered. The product was washed well with water and then dried at 30° C. in vacuo. The slightly pink crystalline 2-(8-cyclohexyloctyl)-1,4-naphthoquinone-2,3-oxide weighed 6.9 g. (82 percent) and melted at 51°–53° C. 2-(8-Cyclohexyloctyl)-1,4-naphthoquinone-2,3-oxide when tested by standard antimalarial testing procedures in mice infected with Plasmodium berghei was found to have antimalarial activity, thereby indicating its further use as a antimalarial agent.

Following the above-described procedure but using 2-(7-cyclohexylheptyl)-1,4-naphthoquinone, there is obtained 2-(7-cyclohexylheptyl)-1,4-naphthoquinone-2,3-oxide.

2-Hydroxy-3-(8-cyclohexyloctyl)-1,4-naphthoquinone—A total of 30 g. (0.0814 mole) of 2-(8-cyclohexyloctyl)-1,4-naphthoquinone-2,3-oxide was added slowly to 150 ml. of concentrated sulfuric acid while maintaining the temperature at about 5° C. The mixture was allowed to warm to room temperature. After the solution became homogeneous it was poured into a solution of 200 g. of ice in 600 ml. of glacial acetic acid. The mixture was heated on a steam bath for one hour, then cooled and filtered. The crystalline product was charcoaled and recrystallized twice from methanol to yield 24.0 g. (80 percent) of 2-hydroxy-3-(8-cyclohexyloctyl)-1,4-naphthoquinone, m.p. 77°–79° C.

Following the above procedure but using 2-(7-cyclohexylheptyl)-1,4-naphthoquinone-2,3oxide, there is obtained 2-hydroxy-3-(7-cyclohexylheptyl)-1,4-naphthoquinone.

2-Hydroxy-3-(8-cyclohexyloctyl)-1,4-naphthoquinone and 2-hydroxy-3-(7-cyclohexylheptyl)-1,4-naphthoquinone were found to have useful antimalarial activity when tested by standard chemotherapeutic procedures against plasmodial infections in animals, e.g., against Plasmodium berghei infections in mice; their activity was significantly greater than the antimalarial activity for previously known and tested 2-hydroxy-3-cyclohexylalkyl- 1,4-naphthoquinones which had been prepared by different procedures than disclosed herein.

The subject matter which the applicants regard as their invention is particularly pointed out and distinctly claimed as follows:

1. A compound selected from 2-(8-cyclohexyl-octyl)-4-(4-sulfophenylazo)-1-naphthol and 2-(7-cyclohexylheptyl)-4-(4-sulfophenylazo)-1-naphthol.

2. 2-(8-Cyclohexyloctyl)-4-(4-sulfophenylazo)-1-naphthol according to claim 1.

\* \* \* \* \*

UNITED STATES PATENT OFFICE
CERTIFICATE OF CORRECTION

Patent No. 3,624,066 (S.N. 870,808) Dated November 30, 1971

Inventor(s) Louis F. Fieser et al.

It is certified that error appears in the above-identified patent and that said Letters Patent are hereby corrected as shown below:

Title page, column 1, following "Inventors", "Belmont;" should read --Belmont, Mass.;-- and "Bethlehem, Mass.;" should read --Bethlehem, N.Y.;--.

Title page, column 2, omit lines 1-8 of the "ABSTRACT" and in place thereof insert --ABSTRACT: Azo compounds 2-Q-4-(4-sulfophenylazo)-1-naphthol which are useful as intermediates in a synthesis of 2-Q-1,4-naphthoquinone, wherein Q in both occurrences is (7-cyclohexylheptyl or 8-cyclohexyloctyl)--.

Column 1, line 6, "1966." should read --1966, now abandoned.--

Column 2, line 13, "1966." should read --1966, now U.S. Patent 3,523,959, issued October 11, 1970.--

Column 2, line 17, "1966." should read --1966, now abandoned.--

Column 3, line 3, "bexyl" should read --hexyl--.

Column 3, line 49, " 'A " should read -- -A --.

Column 4, line 27, "of" should read --or--.

Column 4, line 62, omit "b".

Column 4, line 65, "61°-63 C." should read -- 61-63°C.--.

Column 5, line 29, "a-naphthol" should read -- α-naphthol --.

Column 5, line 68, "2-(b 7" should read -- 2-(7 --.

Column 6, line 36, omit "3(8" and in place thereof insert -- preferred --.

Signed and sealed this 13th day of March 1973.

(SEAL)
Attest:

EDWARD M. FLETCHER, JR.
Attesting Officer

ROBERT GOTTSCHALK
Commissioner of Patents